Figure 1:
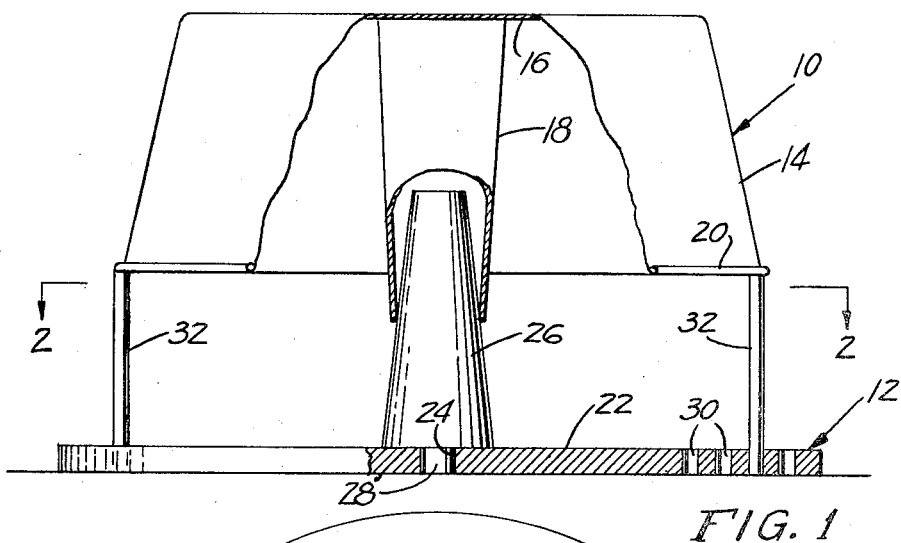

Jan. 15, 1957 R. W. ROBERTS ET AL 2,777,308
COMBINATION CAKE PLATE AND COOLER FOR TUBE CAKES
Filed Aug. 12, 1955

INVENTORS
ROBERT W. ROBERTS
BY VIVIAN G. ROBERTS

McMorrow, Berman + Davidson
ATTORNEYS

United States Patent Office 2,777,308
Patented Jan. 15, 1957

2,777,308

COMBINATION CAKE PLATE AND COOLER FOR TUBE CAKES

Robert W. Roberts and Vivian G. Roberts, Santa Clara, Calif.

Application August 12, 1955, Serial No. 528,044

2 Claims. (Cl. 65—61)

This invention relates to a combination device, which can be used either for the purpose of cooling tube cakes such as angel cakes, chiffon cakes, etc., or as a cake plate, on which the cake can be supported when ready to be cut and served.

Heretofore, it has been proposed to provide devices for supporting a cake pan of the type in which a tube cake is baked, in inverted position, during cooling of the cake. However, in those instances of which we have knowledge, each of the devices previously conceived along this line has been adapted for the support of only one size and shape of cake pan center column. In other words, to insure proper support of the cake pan in inverted position, the supporting device has of necessity involved a support means engaging the tubular column, specially shaped to fit the tubular column of a particular cake pan.

Further, the cake pan support devices previously conceived, so far as is known, have failed to take into account the desirability of providing means supporting the cake pan at the periphery thereof in coactive relationship to the center support post, to assure that the cake pan will be supported in a completely stabilized condition, and heretofore, the support has been provided entirely at the location of the tubular column of the cake pan, placing an undesirably high strain on said tubular column whenever a lateral pressure is imposed thereupon accidentally, as for example, by tilting of the cake pan.

The main object of the present invention is to provide a generally improved support for a cake pan of the type referred to above, which will be so designed as to overcome the deficiencies noted in previously conceived supports used for the same purpose.

A more specific object of the invention is to provide a device as stated which can be used as a combination device, having a removable center post and removable marginal support pins, leaving a flat plate on which the cake may be supported right side up after it has been cooled and removed from the cake pan, and is ready to be cut and served.

Still another object is to provide a device as referred to above which will be constructed at a minimum of cost, and will be usable in the support of tube cake pans differing from one another in relation to the shape and size of the tubular center column, and/or in respect to their overall diameters.

Figure 2:
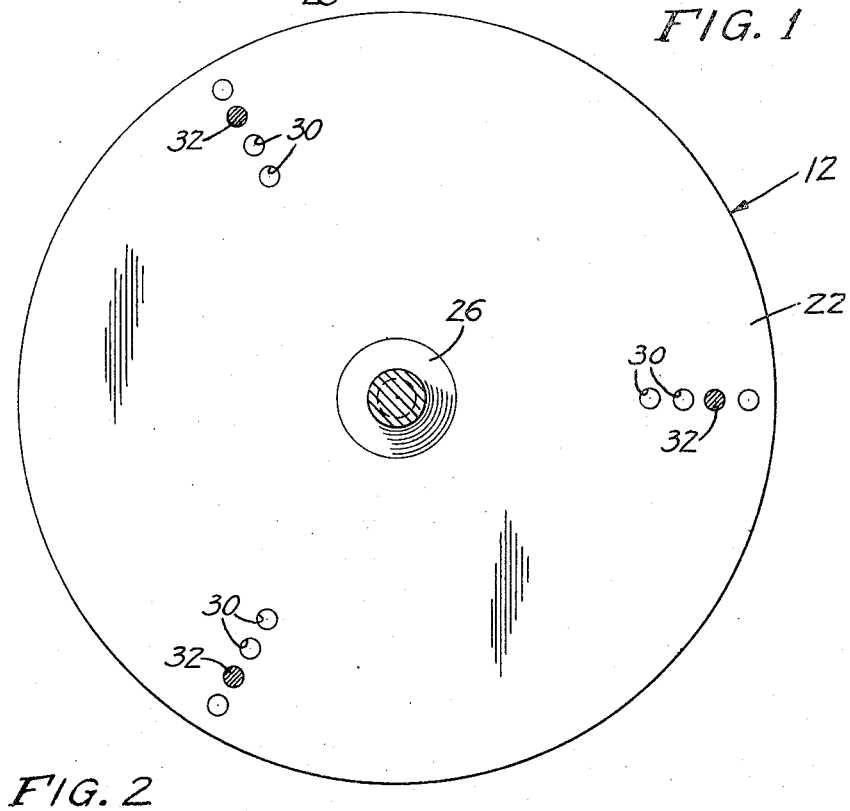

Other objects will appear from the following description, the claims appended thereto, and from the annexed drawings, in which like reference characters designate like parts throughout the several views, in which:

Figure 1 is a view partly in side elevation and partly in section of a device formed according to the present invention, in association with a cake pan, portions of the cake pan being broken away; and Figure 2 is a plan sectional view of the device, substantially on line 2—2 of Figure 1, the cake pan being removed.

Designated generally at 10 is a cake pan of conventional design, the illustrated pan being the type used for baking angel food, chiffon, or other tube cakes. At 12 there has been similarly designated the combination cake cooling and support device formed according to the present invention.

The cake pan, as is usual, is formed from metal material, including a frusto-conical side wall 14 flaring upwardly from a flat base or bottom 16, from which extends upwardly a tubular center column 18 tapering in a direction away from the base 16 and extending to a height above the beaded upper edge 20 of the pan.

The device formed according to the present invention includes a flat, circular support plate 22, which can be formed of wood or similar material, and which is formed with a relatively small, circular center opening 24. Projecting upwardly from the support plate 22 is a center post 26, which in the illustrated example, but not necessarily, is of solid formation, being readily turned from a length of wood or similar material. The center post 26 tapers in a direction upwardly from the support plate 22, and is of circular cross section at all locations along its length. Integrally formed upon the larger or base end of the center post 26 is a depending, cylindrical, axial extension 28, of a diameter corresponding substantially to the diameter of the center opening 24, the length of the extension 28 being equal to the thickness of the support plate 22 or, at the most, being only slightly shorter in length than said thickness.

The extension 28 is removably but snugly fitted in the opening 24, when the device is to be used as a cake cooler, and angularly spaced uniformly about the marginal part of the support plate 22 (Figure 2) are radially extending rows of identically sized apertures 30 of the support plate 22. In the illustrated example, three rows are provided, angularly spaced 120 degrees apart about the support plate 22, with four apertures being provided in each row, the apertures of each row being closely spaced apart uniformly over the length of the row. Apertures 30 are substantially smaller in diameter than the opening 24 of the support plate 22, and are adapted to receive removable, vertically extending support pins 32.

The use of a wholly removable center post 26, and removable pins 32, not only permits use of the base plate 22 as a cake plate after the cake has been removed from the pan 10 and is ready to be cut and served, but further, permits selective employment of pins 32 of a particular length, coacting with a correspondingly selected center post 26 of a particular length and taper. For example, in the illustrated example the cake pan may be considered as being of a large size, with a center column 18 of substantial diameter at its upper, smaller end. Therefore, a particular set of pins 32 is employed, and these are inserted in those apertures 30 which are next to the outermost apertures of the rows of apertures. The pins 32 support the beaded upper edge 20 of the pan 10 when the pan is inverted for cooling of the cake, at uniformly spaced locations about the periphery of the pan, cause the pan to be supported with the free end of the center column 18 in firm engagement over the full circumference of the center column, with the selected center post 26, at a location substantially medially between the upper and lower ends of the center post. Thus, the cake is firmly supported against lateral tilting in any direction, and will be properly cooled with the cake pan supported in its inverted position illustrated in Figure 1.

Another cake pan may be of a diameter equal to that shown in Figure 1, and may also have a center column identical to that shown in Figure 1, but may be so formed that the center column projects upwardly from the beaded edge 20 of the cake pan to a greater extent. Therefore, when this cake pan is supported in inverted position, the beaded edge 20 will be in a higher horizontal plane than that shown in Figure 1, and longer pins 32 would now be used.

In still other instances, the cake pan might be identical in all respects to that shown in Figure 1, except for the fact that the center column 18 is of smaller diameter at its free end than the center column shown. In this instance, the center column would engage the support post 26 at a higher elevation upon a support post, and again, longer pins would be used.

If the cake pan is smaller or larger in diameter than that shown in Figure 1, pins 32 would be located in different apertures 30 than those used in the illustrated example.

The device can be sold with a single support plate 22, and with a plurality of sets of pins 32, and a plurality of center posts 26, selectively employable for the support of cake pans of different sizes, or different from one another in respect to the extent to which the center column 18 projects above the beaded edge 20, or with respect to the diameter of the center column at its outer end. In every instance, by selection of the proper pins 32 and center posts 26, the cake pan will be properly supported in the manner shown in Figure 1.

After the cake has been cooled, and is removed from the pan 10, it can be supported directly upon the flat upper surface of the support plate 22, with the pins 32 and center posts 26 removed, and is ready to be cut and served.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A combination cake cooler and cake plate comprising a flat, circular support plate having a center opening and having radially extending rows of apertures, said rows being angularly spaced uniformly about the marginal portion of said support plate; a plurality of pins, corresponding in number to the number of rows of apertures, removably engaged at one end in selected apertures of the respective rows and projecting upwardly from the support plate for supportably engaging the periphery of an inverted tube cake pan having a tapering, tubular center column; and an upwardly tapering center post formed at its base with a depending, axial extension removably engageable in said center opening, said center post being adapted to engage in said tubular center column of the cake pan.

2. A combination cake cooler and cake plate comprising a flat circular support plate having a center opening and having radially extending rows of apertures, said rows being angularly spaced uniformly about the marginal portion of said support plate; a plurality of pins corresponding in number to the number of rows of apertures removably engaged at one end in selected apertures of the respective rows and projecting upwardly from the support plate for supportably engaging the periphery of an inverted tube cake pan having a tapering tubular central column, and an upwardly tapering center post having the lower end removably engageable in said center opening, said center post being adapted to engage in said tubular center column of the cake pan.

References Cited in the file of this patent

UNITED STATES PATENTS

| Number | Name | Date |
|---|---|---|
| 433,236 | Foster | July 28, 1890 |
| 674,457 | Earl | May 21, 1901 |
| 1,032,680 | Jones | July 16, 1912 |
| 1,168,511 | Kefauver | Jan. 18, 1916 |
| 1,762,805 | Tucher | June 10, 1930 |
| 2,008,898 | Cory | July 23, 1935 |
| 2,188,955 | Nattson | Feb. 6, 1940 |
| 2,274,499 | Nicol | Feb. 24, 1942 |
| 2,661,679 | Van Guilder | Dec. 8, 1953 |